(12) United States Patent
Dhaliwal et al.

(10) Patent No.: US 10,712,562 B2
(45) Date of Patent: Jul. 14, 2020

(54) IMMERSIVE MULTIMEDIA VIEWING

(71) Applicant: HCL Technologies Limited, Noida (IN)

(72) Inventors: Jasbir Singh Dhaliwal, Noida (IN); Sankar Uma Tammana, Noida (IN)

(73) Assignee: HCL Technologies Limited, Noida, Uttar Pradesh ( * ) Notice: Subject to any disclaimer, the term of this patent is extended or adjusted under 35 U.S.C. 154(b) by 155 days.

(21) Appl. No.: 15/590,470

(22) Filed: May 9, 2017

(65) Prior Publication Data

US 2017/0329135 A1 Nov. 16, 2017

(30) Foreign Application Priority Data

May 11, 2016 (IN) .............................. 201611016400

(51) Int. Cl.
*G06F 3/00* (2006.01)
*G02B 27/01* (2006.01)
(Continued)

(52) U.S. Cl.
CPC ....... *G02B 27/017* (2013.01); *G02B 27/0093* (2013.01); *G06F 3/011* (2013.01);
(Continued)

(58) Field of Classification Search
CPC .............. G02B 27/017; G02B 27/2228; G02B 2027/0178; H04N 13/344; H04N 21/4126;
(Continued)

(56) References Cited

U.S. PATENT DOCUMENTS 8,957,835 B2 * 2/2015 Hoellwarth .......... G02B 27/017
345/8
9,158,115 B1 * 10/2015 Worley .............. G02B 27/0172
(Continued)

FOREIGN PATENT DOCUMENTS

EP 1185142 A2 3/2002

OTHER PUBLICATIONS

Epson's, "Merging Epson's Core Technologies Moverio BT-200 Smart Glasses" 2016.

*Primary Examiner* — Anil N Kumar
(74) *Attorney, Agent, or Firm* — HM Law Group LLP; Vanintheran Moodley (57) ABSTRACT

Disclosed is a method and system for enabling immersive viewing of a multimedia. The method may comprise receiving multimedia from one or more source devices, a user data associated with a user wearing an eyewear, a display device data associated with a display device, and an alignment data. The eyewear may comprise a regular glass and a smart glass, and the display device data may comprise dimensions of the display device. The method may further comprise dividing the multimedia in to a primary multimedia and a secondary multimedia based on one or more of the user data, the display device data, and the alignment data. The method may furthermore comprise transmitting the primary multimedia to the display device for display on the display device and transmitting the secondary multimedia to the eyewear for display on the smart glass, thereby enabling immersive viewing of a multimedia.

17 Claims, 4 Drawing Sheets

(51) Int. Cl.
*H04N 21/41* (2011.01)
*H04N 21/462* (2011.01)
*H04N 13/344* (2018.01)
*H04N 21/4363* (2011.01)
*H04N 21/4402* (2011.01)
*H04N 21/442* (2011.01)
*G06F 3/01* (2006.01)
*G02B 27/00* (2006.01)

(52) U.S. Cl.
CPC ....... *H04N 13/344* (2018.05); *H04N 21/4126* (2013.01); *H04N 21/43637* (2013.01); *H04N 21/4402* (2013.01); *H04N 21/44218* (2013.01); *H04N 21/4622* (2013.01); *G02B 2027/0138* (2013.01); *G02B 2027/0178* (2013.01)

(58) Field of Classification Search
CPC ......... H04N 21/43637; H04N 21/4402; H04N 21/44218; H04N 21/4622
See application file for complete search history.

(56) References Cited

U.S. PATENT DOCUMENTS

| | | | |
|---|---|---|---|
| 9,470,894 B2* | 10/2016 | Lee | G02B 27/0172 |
| 9,706,343 B2* | 7/2017 | Ahn | G02B 27/017 |
| 9,939,642 B2* | 4/2018 | Jang | G02B 27/017 |
| 2014/0281012 A1* | 9/2014 | Troxler | H04L 67/2804 |
| | | | 709/231 |
| 2015/0085171 A1* | 3/2015 | Kim | H04N 13/344 |
| | | | 348/333.04 |
| 2016/0217327 A1* | 7/2016 | Osterhout | G02B 27/017 |
| 2016/0345124 A1* | 11/2016 | Ahn | G02B 27/017 |

* cited by examiner

IMMERSIVE MULTIMEDIA VIEWING

PRIORITY INFORMATION

The present application claims priority from Indian Patent Application No. 201611016400, filed on 11 May 2016, the entirety of which is hereby incorporated by reference.

TECHNICAL FIELD

The present subject matter described herein, in general, relates to a system and a method for immersive viewing, and more particularly a system and a method for enabling immersive viewing of a multimedia

BACKGROUND

Now a day, the word immersive has been applied to everything from handheld video games to ultra-high-res digital presentations projected on huge hemispherical domes. Virtual reality systems with head-mounted displays may be considered as one of the examples of considered immersive. Typically, the immersive experience may be understood as giving viewers the impression that they are actually in the place depicted by the presentation. The immersive experience generally depends on successfully tricking several senses, principally sight and hearing, and eliminating or reducing any cues that would tend to break the immersive experience. The basic principle in creating a visually immersive experience is to fill the audience's field of view. Generally, the closer something is to viewer, the larger it appears to be, that is, the more of your field of view it fills. A larger object farther away can appear to be the same size as a smaller one that is closer. So with an image projected on a screen, a smaller screen can be made to seem bigger simply by getting closer to it. As long as the image quality is high enough that the viewer doesn't begin to see film grain, digital pixels, or other distracting artefacts, the experience is nearly, if not precisely, the same as seeing a larger screen from farther away.

Conventionally, almost all efforts to create immersive experiences have involved increasing the amount of information presented, with larger film frames, higher frame rates, or both on a picture screen. Further, televisions have been in existence for a long time now, however few improvements have enabled immersive viewing experience. One major hindrance in enjoying the truly immersive experience is that in addition to TV screen, viewers are also looking at the areas surrounding the TV screen. This is primarily due to the fact that viewer's field of view does not exactly match the TV screen dimensions. And the viewers are able to see extra area or background, thus having an impact on the overall immersive experience.

SUMMARY

Before the present systems and methods for enabling immersive viewing of a multimedia, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular implementations or versions or embodiments only, and is not intended to limit the scope of the present application. This summary is provided to introduce aspects related to a system and a method for enabling immersive viewing of a multimedia. This summary is not intended to identify essential features of the claimed subject matter nor is it intended for use in determining or limiting the scope of the claimed subject matter.

In one implementation, a system for enabling immersive viewing of a multimedia is disclosed. In one aspect, the system comprises a memory and a processor coupled to the memory. Further, the processor may be capable of executing instructions in the memory to perform one or more steps. In the aspect, the system may receive multimedia from one or more source devices, a user data associated with a user wearing an eyewear, a display device data associated with a display device, and an alignment data. The eyewear may comprise a regular glass and a smart glass, the display device data may comprise dimensions of the display device, and the alignment data may be indicative of an alignment between the eyewear and the display device. Upon receiving, the system may divide the multimedia in to a primary multimedia and a secondary multimedia based on one or more of the user data, the display device data, and the alignment data. Further to dividing the system may transmit the primary multimedia to the display device for display on the display device and transmit the secondary multimedia to the eyewear for display on the smart glass, thereby enabling immersive viewing of a multimedia.

In one implementation, a method for enabling immersive viewing of a multimedia is disclosed. In one aspect, the method may comprise receiving multimedia from one or more source devices, a user data associated with a user wearing an eyewear, a display device data associated with a display device, and an alignment data. The eyewear may comprise a regular glass and a smart glass, the display device data may comprise dimensions of the display device, and the alignment data may be indicative of an alignment between the eyewear and the display device. Further, the method may comprise dividing the multimedia in to a primary multimedia and a secondary multimedia based on one or more of the user data, the display device data, and the alignment data. Furthermore, the method may comprise transmitting the primary multimedia to the display device for display on the display device and transmitting the secondary multimedia to the eyewear for display on the smart glass, thereby enabling immersive viewing of a multimedia.

In yet another implementation, non-transitory computer readable medium embodying a program executable in a computing device for enabling immersive viewing of a multimedia is disclosed. In one aspect, the program may comprise a program code for receiving multimedia from one or more source devices, a user data associated with a user wearing an eyewear, a display device data associated with a display device, and an alignment data. The eyewear may comprise a regular glass and a smart glass, the display device data may comprise dimensions of the display device, and the alignment data may be indicative of an alignment between the eyewear and the display device. The program may comprise a program code for dividing the multimedia in to a primary multimedia and a secondary multimedia based on one or more of the user data, the display device data, and the alignment data. The program may comprise a program code for transmitting the primary multimedia to the display device for display on the display device. The program may comprise a program code for transmitting the secondary multimedia to the eyewear for display on the smart glass, thereby enabling immersive viewing of a multimedia.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and system disclosed in the document and the figures.

The present subject matter is described detail with reference to the accompanying figures. In the figures, the leftmost digit(s) of a reference number identifies the figure in which the reference number first appears. The same numbers are used throughout the drawings to refer various features of the present subject matter.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods for enabling immersive viewing of a multimedia, similar or equivalent to those described herein can be used in the practice or testing of embodiments of the present disclosure, the exemplary, systems and methods for enabling immersive viewing of a multimedia are now described. The disclosed embodiments for enabling immersive viewing of a multimedia are merely examples of the disclosure, which may be embodied in various forms.

Various modifications to the embodiment will be readily apparent to those skilled in the art and the generic principles herein may be applied to other embodiments for enabling immersive viewing of a multimedia. However, one of ordinary skill in the art will readily recognize that the present disclosure for enabling immersive viewing of a multimedia is not intended to be limited to the embodiments described, but is to be accorded the widest scope consistent with the principles and features described herein.

In an implementation, a system and method for enabling immersive viewing of a multimedia, is described. In one embodiment, multimedia from one or more source devices, a user data associated with a user wearing an eyewear, a display device data associated with a display device, and an alignment data may be received. In one example, the source device may be a set-top box, a CD-DVD player, a mobile, and a server and the multimedia may be one or more of a video file, an image files, and television program. The user data may comprises one or more user instructions, user preferences, and user gaze data. The display device data may comprises dimensions of the display device, and the alignment data may be indicative of an alignment between the eyewear and the display device. Further, the alignment between the eyewear and the display device may be monitored based on 2D and 3D cameras situated in the vicinity of the display.

In one example, the eyewear may comprise a regular glass and a smart glass. In one other example the eyewear comprises the regular glass surround by the smart glass. Further, eyewear configuration data may be received from the eyewear. The eyewear configuration data may comprise configuration of the smart glass, and total number of smart glass in the eyewear. Further, the eyewear may be switched between a transparent mode and a non-transparent mode based on the alignment data. The eyewear is one of spectacles, a monocle, contact lenses, and an eye glass In the embodiment, upon receiving, the multimedia may be divided in to a primary multimedia and a secondary multimedia based on one or more of the user data, the display device data, and the alignment data. In one example, the secondary multimedia may be further divided into two or more tertiary multimedia based on the eyewear configuration data and user data.

Further in the embodiment, the primary multimedia is transmitted to the display device for display on the display device and the secondary multimedia and the tertiary multimedia is transmitted to the eyewear for display on the smart glass, thereby enabling immersive viewing of a multimedia.

Figure 1A:
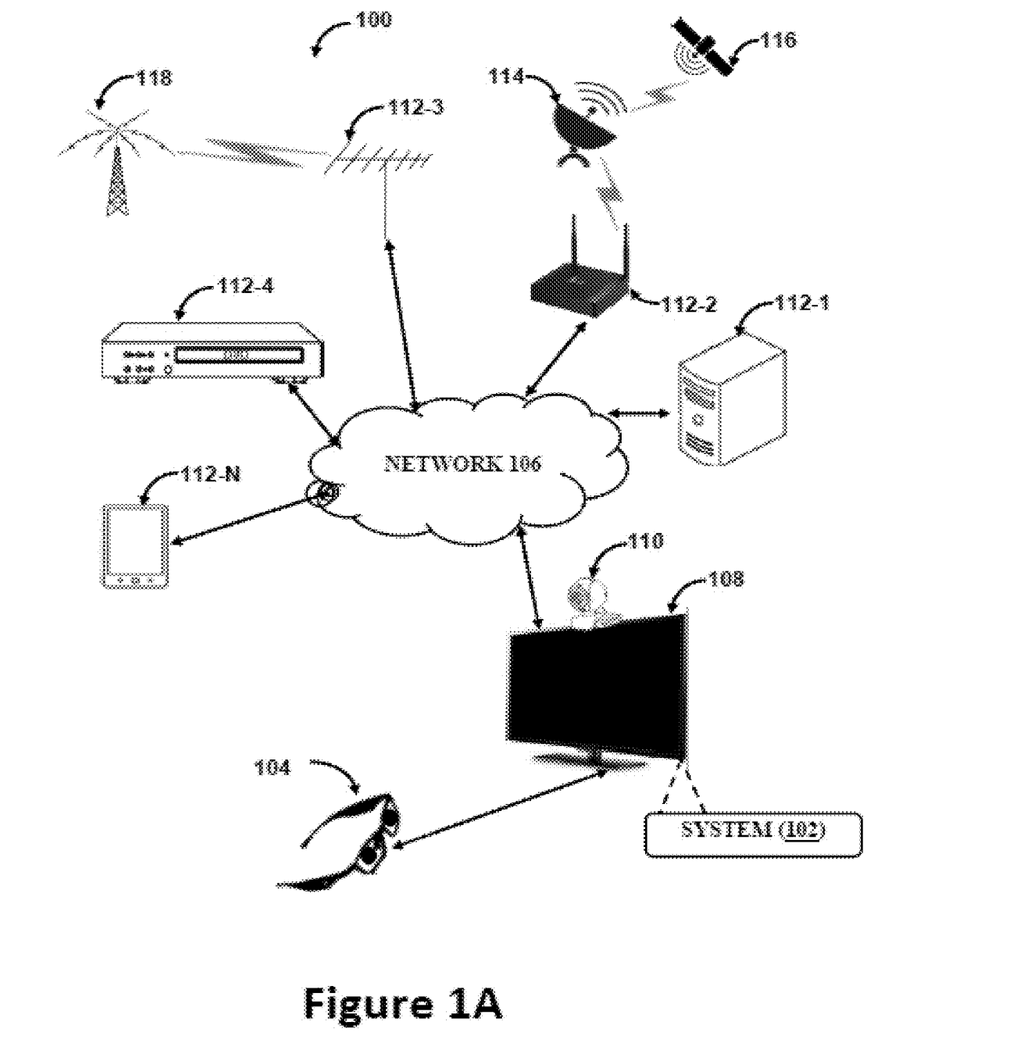
FIGS. 1A and 1B illustrates a network implementation of a system for enabling immersive viewing of a multimedia, in accordance with an embodiment of the present subject matter.

Referring now to FIG. 1, a network implementation 100 of a system 102 for enabling immersive viewing of a multimedia, in accordance with an embodiment of the present subject matter may be described. In one embodiment, the present subject matter is explained considering that the system 102. In one example the system 102 may be implemented as a standalone system 102 connected to the network 106. In other examples the system 102 may be implemented in one or more of a display device 108, a server 112, and an eyewear 104.

It may be understood that the system 102 may also be implemented in a variety of computing systems, such as a laptop computer, a desktop computer, a notebook, a workstation, a mainframe computer, a server, a network server, a cloud-based computing environment, or a mobile and the like. It may also be understood that the system 102 supports a plurality of browsers and all viewports. Examples of the plurality of browsers may include, but not limited to, Chrome™, Mozilla™, Internet Explorer™, Safari™, and Opera™. It will also be understood that the system 102 may be accessed by multiple users through one or more controller. In example, the controllers may be a joystick, a game pad, or haptic glows and the like. Furthermore, the system 102 may be communicatively coupled to a database for storing data. In one example, the database may be any of the relationship database and the like.

In one example, the display device 108 may be a television. In other example, the display device may be a laptop, desk top, a projector, and the like. Further the display device 108 may comprise a camera 110 placed closed to the display device 108. Further, the system may also be communicatively coupled to one or more source devices 112-1, 112-2, 112-3, 112-4 . . . 112-N. The source devices 112 may be a DVD payer 112-4, a mobile 112-N, a set top box 112-2 receiving broadcast from a satellite 116, an antenna 112-3 receiving broadcast from broadcasting tower 118. Further the system may be communicatively coupled with an eyewear 104. The eyewear may comprise a combination of regular glass and smart glass.

In one implementation, the network 106 may be a wireless network, a wired network or a combination thereof. The network 106 can be implemented as one of the different types of networks, such as intranet, local area network (LAN), Wireless Personal Area Network (WPAN), Wireless Local Area Network (WLAN), wide area network (WAN), the internet, and the like. The network 106 may either be a dedicated network or a shared network. The shared network represents an association of the different types of networks that use a variety of protocols, for example, MQ Telemetry Transport (MQTT), Extensible Messaging and Presence Protocol (XMPP), Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In an implementation, a system 102 for enabling immersive viewing of a multimedia is described. In one example, the system 102 may receive multimedia from one or more source devices 112, a user data associated with a user wearing an eyewear 104, a display device data associated with a display device 108, and an alignment data may be received. In one example, the source device 12 may be a set-top box 112-2, a CD-DVD player 112-4, a mobile 112-N, and a server 112-1 and the multimedia may be one or more of a video file, an image files, and television program. The user data may comprises one or more user instructions, user preferences, and user gaze data. In one example, the user data may be obtained from eyewear 104 comprising a camera. The display device data may comprises dimensions of the display device 108, and the alignment data may be indicative of an alignment between the eyewear and the display device. In one example, the alignment data may be obtained utilizing the camera 110 installed on the display device 108. In other example, the alignment between the eyewear and the display device may be monitored based on 2D and 3D cameras 110 situated in the vicinity of the display.

Figure 1B:
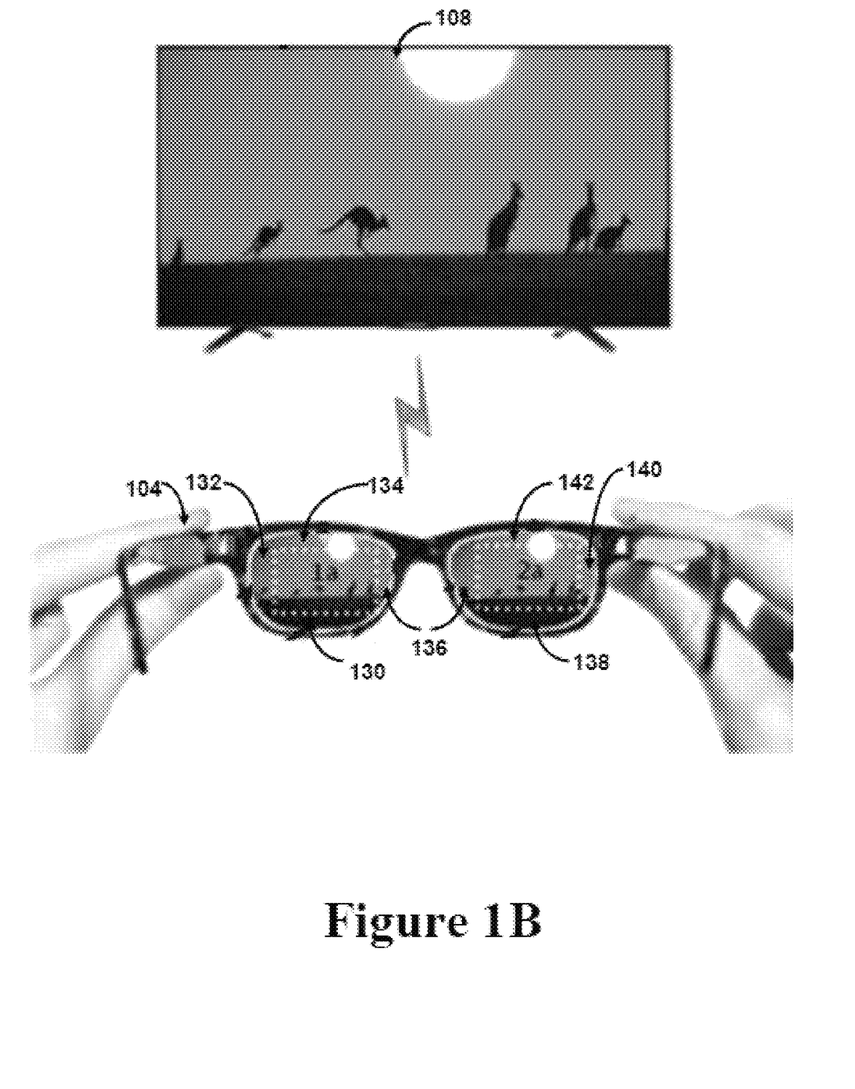

In one example, the eyewear 104 may comprise a regular glass and a smart glass. In one other example the eyewear 104 comprises the regular glass surround by the smart glass, as shown in FIG. 1B. As shown in FIG. 1B, the eyewear 104 comprises of regular glass 1a and 2a surrounded by smart glass sections 130, 132, 134, 136, 138, 140, 142. Further, eyewear configuration data may be received from the eyewear. The eyewear configuration data may comprise configuration of the smart glass, and total number of smart glass in the eyewear. In the example, of FIG. 1B, the eyewear configuration data may comprise total number of smart glass=8, and orientation of the smart glass and the regular glass. Further, the eyewear 104 may be switched between a transparent mode and a non-transparent mode based on the alignment data. The eyewear 104 is one of spectacles, a monocle, contact lenses, and an eye glass In the embodiment, upon receiving, the multimedia may be divided in to a primary multimedia and a secondary multimedia based on one or more of the user data, the display device data, and the alignment data. In one example, the secondary multimedia may be further divided into two or more tertiary multimedia based on the eyewear configuration data and user data.

Further in the embodiment, the primary multimedia is transmitted to the display device 108 for display on the display device 108 and the secondary multimedia and the tertiary multimedia is transmitted to the eyewear 104 for display on the smart glass, thereby enabling immersive viewing of a multimedia.

In one example an immersive mode, of the system and method for enabling immersive viewing of a multimedia, the multimedia may be directly displayed on the display device. A user may further provide instruction to the system. Based on the instruction the multimedia may be zoomed. In one example, the zooming may be based on the dimensions of the display device. Further based on the zooming the multimedia is divided into the primary multimedia and the secondary multimedia. The primary multimedia may be of the multimedia falling inside perimeter of the display device, and the secondary multimedia may be the multimedia falling outside perimeter of the display device.

Figure 2:
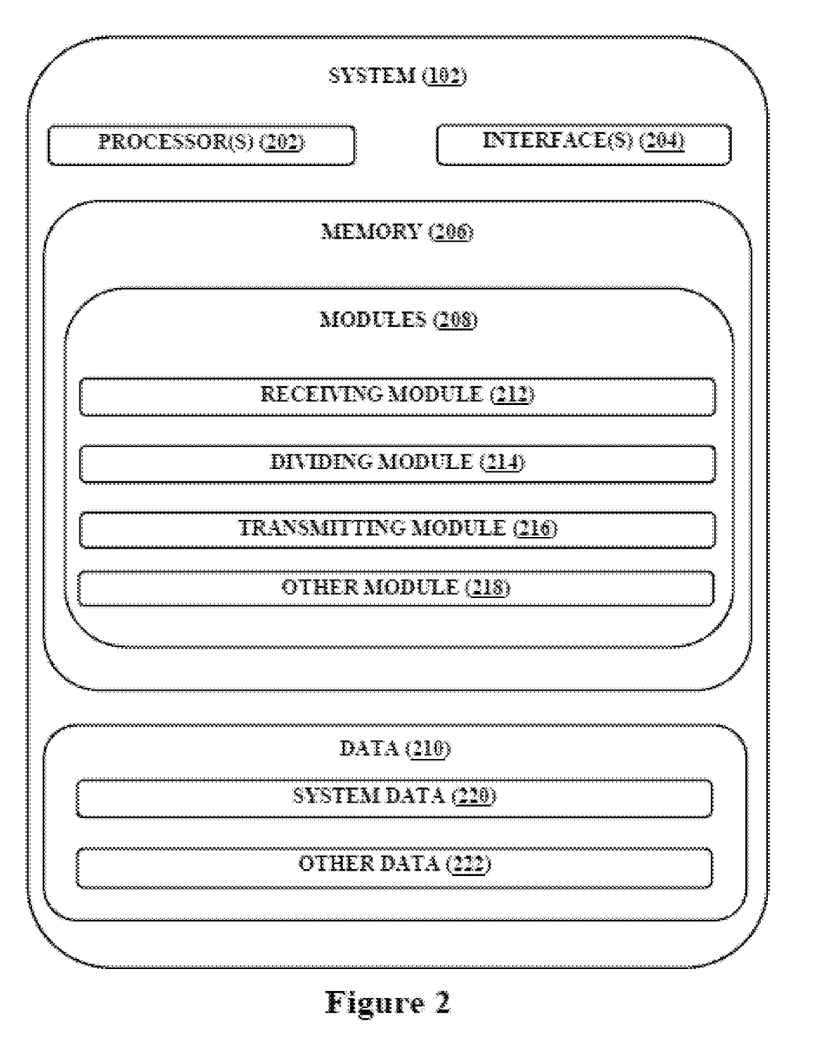
FIG. 2 illustrates the system and its subcomponents for enabling immersive viewing of a multimedia, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a receiving module 212, a dividing module 214, a transmitting module 216 and other module 218. The other modules 218 may include programs or coded instructions that supplement applications and functions of the system 102. The modules 208 described herein may be implemented as software modules that may be executed in the cloud-based computing environment of the system 102.

The memory 206, amongst other things, serves as a repository for storing data processed, received, and generated by one or more of the modules 208. The memory 206 may include data generated as a result of the execution of one or more modules in the other module 218. In one implementation, the memory may include data 210. Further, the data 210 may include a system data 220 for storing data processed, computed received and generated by one or more of the modules 208. Furthermore, the data 210 may include other data 222 for storing data generated as a result of the execution of one or more modules in the other module 218.

In one implementation, at first, a user may use the display device 108 to access the system 102 via the I/O interface 204. The user may register using the I/O interface 204 in order to use the system 102. In one aspect, the user may access the I/O interface 204 of the system 102 and the display device 108 for obtaining information or providing input information such initiation of immersive mode. In one implementation the system 102 may automatically provide information to the user through I/O interface 204, the display device 108.

Receiving Module 212

Referring to FIG. 2, in an embodiment the receiving module 212 may receive multimedia from one or more source devices, a user data associated with a user wearing an eyewear 104, a display device data associated with a display device, and an alignment data may be received. In one example, the source device may be a set-top box, a CD-DVD player, a mobile, and a server and the multimedia may be one or more of a video file, an image files, and television program. The user data may comprises one or more user instructions, user preferences, and user gaze data. In one example, the user data may be obtained from eyewear 104 comprising a camera. The display device data may comprises dimensions of the display device 108, and the alignment data may be indicative of an alignment between the eyewear and the display device. In one example, the alignment data may be obtained utilizing the camera 110 installed on the display device 108. In other example, the alignment between the eyewear and the display device may be monitored based on 2D and 3D cameras situated in the vicinity of the display.

In one example, the eyewear 104 comprises the regular glass surround by the smart glass, as shown in FIG. 1B. As shown in FIG. 1B, the eyewear 104 comprises of regular glass 1a and 2a surrounded by smart glass sections 130, 132, 134, 136, 138, 140, 142. Further, eyewear configuration data may be received from the eyewear. The eyewear configuration data may comprise configuration of the smart glass, and total number of smart glass in the eyewear. In the example, of FIG. 1B, the eyewear configuration data may comprise total number of smart glass=8, and orientation of the smart glass and the regular glass. Further, the eyewear 104 may be switched between a transparent mode and a non-transparent mode based on the alignment data. The eyewear 104 is one of spectacles, a monocle, contact lenses, and an eye glass. The eyewear can be made of special glass that can be transparent and non-transparent based on alignment data and user preferences. In one embodiment, upon misalignment between the display device and the eyewear, the eyewear may change to transparent mode.

Dividing Module 214

Further in the embodiment, upon receiving the multimedia, the user data, the display device data, the alignment data, and the eyewear configuration data, the dividing module 214 may divide the multimedia in to a primary multimedia and a secondary multimedia based on one or more of the user data, the display device data, and the alignment data. Further in one other embodiment, the dividing module 214 may divide the secondary multimedia into two or more tertiary multimedia based on the eyewear configuration data and user data. Furthermore, the dividing module 214 may store the primary multimedia, secondary multimedia, and the tertiary multimedia in the system data 220.

In the example, of FIG. 1B, upon receiving the multimedia, the user data, the display device data, the alignment data, and the eyewear configuration data, the dividing module 214 may divide the multimedia in to a primary multimedia to be displayed on display device 108 and a secondary multimedia to displayed on the eyewear 104 based on one or more of the user data, the display device data, and the alignment data. Further in one other embodiment, the dividing module 214 may divide the secondary multimedia, to display on the eyewear 104, into tertiary multimedia. IN the example, the tertiary multimedia may be divided based on the number of smart glass=8. IN other words, the secondary multimedia is divided in to plurality of tertiary multimedia associated with each of the smart glass 130, 132, 134, 136, 138, 140, 142.

Transmitting Module 216

In the embodiment, upon dividing the multimedia, the transmitting module 216 may transmit the primary multimedia to the display device for display on the display device and the secondary multimedia and the tertiary multimedia to the eyewear for display on the smart glass, thereby enabling immersive viewing of a multimedia.

In the example, of the FIG. 1B, the primary multimedia is transmitted to the display device 108 for display to the user wearing the eyewear 104, and the secondary multimedia comprising a plurality of the tertiary multimedia is transmitted to the eyewear 104 for display on the smart glass. In the example, each of the tertiary multimedia may be displayed on the smart glass 130, 132, 134, 136, 138, 140, 142 surrounding the regular glass 1a, and 2a, thereby enabling immersive viewing.

In the embodiment, the transmitting module 216 may also monitor the alignment between the eyewear and the display device based on 2D and 3D cameras situated in the vicinity of the display. Upon monitoring, the transmitting module 216 may generate an alert if a misalignment between the eyewear and the display device is identified based on the monitoring. In one example, the misalignment may be identified by the orientation of the eyewear and the display device fall outside the predefined range, such as distance from the display device in the range of 10 to 15 feet and the like. Further to generating an alert, the transmitting module 216 may generate one or more instructions for correction of the misalignment. The instruction may be inform of notification displayed on the display device or by way of a buzzer or the like. The instruction may be in the form of guidance to achieve optimal immersive viewing. Furthermore, the transmitting module 216 may store the instructions in the system data 220.

In some examples of implementation, the immersive viewing may be initiated based on user instructions. In one example, the user may provide a command to the system 102 for immersive viewing. Upon receiving the command, the system 102 may divided the multimedia and provide the extra content to the eyewear for viewing the extra. In one sub example, the extra content may be provided by the broadcaster of the multimedia, or the source device. In other example, the system may zoom in/focus the current multimedia being displayed on the display device. Upon zooming in, the extra content falling outside the display device may be displayed on the eyewear. Thus the system, may work with the standard content being provided by source device and by zooming the content before being rendered onto display device. Further in case of extra content, each of the extra content to be displayed on each of the smart glass may be customized or switched on/off.

In one example an immersive mode, of the system and method for enabling immersive viewing of a multimedia, the multimedia may be directly displayed on the display device. A user may further provide instruction to the system. Based on the instruction the multimedia may be zoomed. In one example, the zooming may be based on the dimensions of the display device. Further based on the zooming the multimedia is divided into the primary multimedia and the secondary multimedia. The primary multimedia may be of the multimedia falling inside perimeter of the display device, and the secondary multimedia may be the multimedia falling outside perimeter of the display device.

Exemplary embodiments for enabling immersive viewing of a multimedia discussed above may provide certain advantages. Though not required to practice aspects of the disclosure, these advantages may include those provided by the following features.

Some embodiments of the system and the method enable use of the eyewear for day to day activity.

Some embodiments of the system and the method enable completely immersive experience on diverse TV screens sizes.

Some embodiments of the system and the method enable augmented reality in TV viewing.

Some embodiments of the system and the method enable the viewer to have a completely immersive experience since the complete field of view will be filled with display device content only and the viewer won't get distracted by objects present around display device.

Some embodiments of the system and the method enable won't completely block the viewer's visibility and the viewer would be able to attend to other urgent tasks without removing smart glasses.

Figure 3:
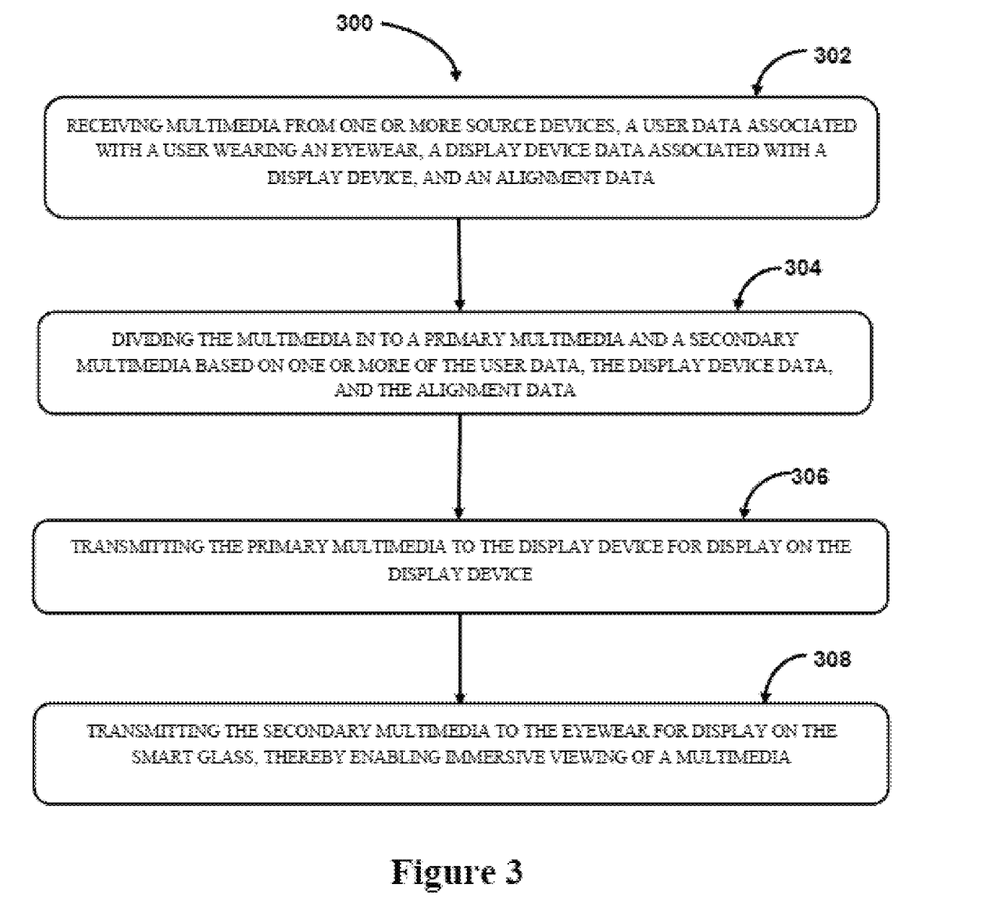
FIG. 3 illustrates a method for enabling immersive viewing of a multimedia, in accordance with an embodiment of the present subject matter.

Referring now to FIG. 3, a method 300 for enabling immersive viewing of a multimedia is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types.

The order in which the method 300 for enabling immersive viewing of a multimedia as described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, multimedia from one or more source devices, a user data associated with a user wearing an eyewear, a display device data associated with a display device, and an alignment data may be received. The eyewear may comprise a regular glass and a smart glass, the display device data may comprise dimensions of the display device, and the alignment data may be indicative of an alignment between the eyewear and the display device. In an implementation, the receiving module 212 may receive multimedia from one or more source devices, a user data associated with a user wearing an eyewear, a display device data associated with a display device, and an alignment data. Further the receiving module 212 may store the multimedia from the one or more source devices, the user data associated with the user wearing the eyewear, the display device data associated with the display device, and the alignment data in the system data 220.

At block 304, the multimedia may be divided in to a primary multimedia and a secondary multimedia based on one or more of the user data, the display device data, and the alignment data. In an implementation, the dividing module 214 may divide the multimedia in to a primary multimedia and a secondary multimedia based on one or more of the user data, the display device data, and the alignment data and may store primary multimedia and the secondary multimedia in the system data 220.

At block 306, the primary multimedia may be transmitted to the display device for display on the display device. In the implementation, the transmitting module 216 may transmit the primary multimedia to the display device for display on the display device.

At block 308, the secondary multimedia may be transmitted to the eyewear for display on the smart glass, thereby enabling immersive viewing of a multimedia. In the implementation, the transmitting module 216 may transmit the secondary multimedia to the eyewear for display on the smart glass, thereby enabling immersive viewing of a multimedia.

Exemplary embodiments discussed above may provide certain advantages, disclosed in the detailed description. Though not required to practice some aspects of the disclosure, these advantages may include a method and system for enabling immersive viewing of a multimedia.

Although implementations for methods and systems for enabling immersive viewing of a multimedia have been described in language specific to structural features and/or methods, it is to be understood that the appended claims are not necessarily limited to the specific features or methods described. Rather, the specific features and methods are disclosed as examples of implementations for enabling immersive viewing of a multimedia.

We claim:

1. A method for enabling immersive viewing of a multimedia, the method comprising:
   receiving, by a processor, multimedia from one or more source devices, a user data associated with a user wearing an eyewear, a display device data associated with a display device, eyewear configuration data from the eyewear and an alignment data, wherein the eyewear comprises two or more smart glass sections present around a regular glass, wherein the display device data comprises dimensions of the display device, wherein the eyewear configuration data comprises configuration of the smart glass sections, and a total number of smart glass sections, and wherein the alignment data is indicative of an alignment between the eyewear and the display device;
   dividing, by the processor, the multimedia in to a primary multimedia and a secondary multimedia based on one or more of the user data, the display device data, and the alignment data;
   dividing, by the processor, the secondary multimedia into two or more tertiary multimedia based on the eyewear configuration data, wherein the total number of tertiary multimedia is equal to the total number of smart glass sections, and the two or more tertiary multimedia are different from the primary multimedia;

transmitting, by the processor, the primary multimedia to the display device for display on the display device; and transmitting, by the processor, the two or more tertiary multimedia to the eyewear for display on the smart glass sections, thereby enabling immersive viewing of a multimedia.

2. The method of claim 1, further comprising displaying, by the processor, the multimedia on the display device; and zooming, by the processor, the multimedia for dividing the multimedia into the primary multimedia and the secondary multimedia based on the user instructions and the display device data, wherein the primary multimedia is indicative of the multimedia falling inside perimeter of the display device, and wherein the secondary multimedia is indicative of the multimedia falling outside perimeter of the display device.

3. The method of claim 1, further comprising monitoring, by the processor, the alignment between the eyewear and the display device based on 2D and 3D cameras situated in the vicinity of the display;

generating, by the processor, an alert indicative of a misalignment between the eyewear and the display device based on the monitoring; and generating, by the processor, one or more instructions for correction of the misalignment.

4. The method of claim 1, further comprising switching, by the processor, between a transparent mode and a non-transparent mode based on the alignment data.

5. The method of claim 1, wherein the user data comprises one or more user instructions, user preferences, and user gaze data.

6. The method of claim 1, wherein the eyewear is one of spectacles, a monocle, contact lenses, and an eye glass.

7. The method of claim 1, wherein the source device is one or more of set-top box, a CD-DVD player, a mobile, and a server.

8. The method of claim 1, wherein the multimedia is one or more of a video file, an image files, television program.

9. A system for enabling immersive viewing of a multimedia, the system comprising:
   a memory; and
   a processor coupled to the memory, wherein the processor is capable of executing instructions to perform steps of:
   receiving multimedia from one or more source devices, a user data associated with a user wearing an eyewear, a display device data associated with a display device, eyewear configuration data from the eyewear and an alignment data, wherein the eyewear comprises two or more smart glass sections present around a regular glass, wherein the display device data comprises dimensions of the display device, wherein the eyewear configuration data comprises configuration of the smart glass sections, and a total number of smart glass sections, and wherein the alignment data is indicative of an alignment between the eyewear and the display device;
   dividing the multimedia in to a primary multimedia and a secondary multimedia based on one or more of the user data, the display device data, and the alignment data;
   dividing the secondary multimedia into two or more tertiary multimedia based on the eyewear configuration data, wherein the total number of tertiary multimedia is equal to the total number of smart glass sections, and the two or more tertiary multimedia are different from the primary multimedia;

transmitting the primary multimedia to the display device for display on the display device; and transmitting the two or more tertiary multimedia to the eyewear for display on the smart glass sections, thereby enabling immersive viewing of a multimedia.

10. The system of claim 9, further comprising displaying the multimedia on the display device; and zooming the multimedia for dividing the multimedia into the primary multimedia and the secondary multimedia based on the user instructions and the display device data, wherein the primary multimedia is indicative of the multimedia falling inside perimeter of the display device, and wherein the secondary multimedia is indicative of the multimedia falling outside perimeter of the display device.

11. The system of claim 9, further comprising:

Monitoring the alignment between the eyewear and the display device based on 2D and 3D cameras situated in the vicinity of the display;

generating an alert indicative of a misalignment between the eyewear and the display device based on the monitoring; and generating one or more instructions for correction of the misalignment.

12. The system of claim 9, further comprising switching, by the processor, between a transparent mode and a non-transparent mode based on the alignment data.

13. The system of claim 9, wherein the user data comprises one or more user instructions, user preferences, and user gaze data.

14. The system of claim 9, wherein the eyewear is one of spectacles, a monocle, contact lenses, and an eye glass.

15. The system of claim 9, wherein the source device is one or more of a set-top box, a CD-DVD player, a mobile, and a server.

16. The system of claim 9, wherein the multimedia is one or more of a video file, an image files, television program.

17. A non-transitory computer program product having embodied thereon a computer program for enabling immersive viewing of a multimedia, the computer program product storing instructions, the instructions comprising instructions for:
   receiving multimedia from one or more source devices, a user data associated with a user wearing an eyewear, a display device data associated with a display device, eyewear configuration data from the eyewear and an alignment data, wherein the eyewear comprises a regular glass surrounded by two or more smart glass sections present around a regular glass, wherein the display device data comprises dimensions of the display device, wherein the eyewear configuration data comprises configuration of the smart glass sections, and a total number of smart glass sections, and wherein the alignment data is indicative of an alignment between the eyewear and the display device;
   dividing the multimedia in to a primary multimedia and a secondary multimedia based on one or more of the user data, the display device data, and the alignment data;
   dividing the secondary multimedia into two or more tertiary multimedia based on the eyewear configuration data, wherein the total number of tertiary multimedia is equal to the total number of smart glass sections, and the two or more tertiary multimedia are different from the primary multimedia;

transmitting the primary multimedia to the display device for display on the display device; and transmitting the two or more tertiary multimedia to the eyewear for display on the smart glass sections, thereby enabling immersive viewing of a multimedia.

\* \* \* \* \*